United States Patent
Akgul et al.

(10) Patent No.: US 11,675,423 B2
(45) Date of Patent: Jun. 13, 2023

(54) USER POSTURE CHANGE DETECTION FOR HEAD POSE TRACKING IN SPATIAL AUDIO APPLICATIONS

(71) Applicant: Apple Inc., Cupertino, CA (US)

(72) Inventors: Mehmet Akgul, San Jose, CA (US); Alexander Singh Alvarado, San Jose, CA (US); Xiaoyuan Tu, Sunnyvale, CA (US); Margaret H. Tam, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/351,195

(22) Filed: Jun. 17, 2021

(65) Prior Publication Data

US 2021/0397250 A1 Dec. 23, 2021

Related U.S. Application Data

(60) Provisional application No. 63/041,815, filed on Jun. 19, 2020.

(51) Int. Cl.
G06F 3/01 (2006.01)
H04S 7/00 (2006.01)
G01P 15/18 (2013.01)

(52) U.S. Cl.
CPC .............. *G06F 3/012* (2013.01); *H04S 7/304* (2013.01); *G01P 15/18* (2013.01)

(58) Field of Classification Search
CPC .......... H04S 7/304; H04S 3/004; H04S 3/008; H04S 2400/01; H04S 2400/11; H04R 5/033; G06F 3/011; G06F 3/0346; G01P 15/18

USPC ................. 381/300, 303, 307, 309, 310, 311
See application file for complete search history.

(56) References Cited

U.S. PATENT DOCUMENTS

| | | |
|---|---|---|
| 9,459,692 B1 | 10/2016 | Li |
| 10,339,078 B2 | 7/2019 | Nair et al. |
| 2005/0281410 A1* | 12/2005 | Grosvenor ............ H04H 60/47 381/61 |
| 2014/0153751 A1 | 6/2014 | Wells |
| 2016/0119731 A1 | 4/2016 | Lester, III |
| 2016/0269849 A1 | 9/2016 | Riggs et al. |
| 2017/0295446 A1 | 10/2017 | Thagadur Shivappa |
| 2018/0091923 A1 | 3/2018 | Satongar et al. |
| 2018/0220253 A1* | 8/2018 | Kärkkäinen ........... H04R 5/033 |
| 2019/0313201 A1 | 10/2019 | Torres et al. |

(Continued)

*Primary Examiner* — Yosef K Laekemariam
(74) *Attorney, Agent, or Firm* — Fish & Richardson P.C.

(57) ABSTRACT

Embodiments are disclosed for user posture change detection for triggering re-centering of spatial audio. In an embodiment, a method comprises: obtaining source device motion data from a source device and headset motion data from a headset worn by a user; estimating a gravity vector from one of the source device or headset motion data; splitting the source device and headset motion data into vertical and horizontal planes, the vertical plane in the direction of the estimated gravity vector and the horizontal plane perpendicular to the estimated gravity vector; calculating similarity measures based on the source device motion data and headset motion data in the vertical and horizontal planes over a time window; detecting a posture change event based on the calculated similarity measures; and resetting a head tracker error after the detected user posture change event.

20 Claims, 15 Drawing Sheets

(56) References Cited

U.S. PATENT DOCUMENTS

| | | |
|---|---|---|
| 2019/0379995 A1 | 12/2019 | Lee et al. |
| 2020/0037097 A1 | 1/2020 | Torres et al. |
| 2020/0059749 A1 | 2/2020 | Ericsson et al. |
| 2020/0169828 A1 | 5/2020 | Liu et al. |
| 2021/0211825 A1* | 7/2021 | Joyner .................... H04S 7/301 |
| 2021/0396779 A1 | 12/2021 | Sarathy et al. |
| 2021/0397249 A1 | 12/2021 | Kriminger et al. |
| 2021/0400414 A1 | 12/2021 | Tu et al. |
| 2021/0400418 A1 | 12/2021 | Tam et al. |
| 2021/0400419 A1 | 12/2021 | Turgut et al. |
| 2021/0400420 A1 | 12/2021 | Tam et al. |
| 2022/0103964 A1 | 3/2022 | Tu et al. |
| 2022/0103965 A1 | 3/2022 | Tu et al. |

* cited by examiner

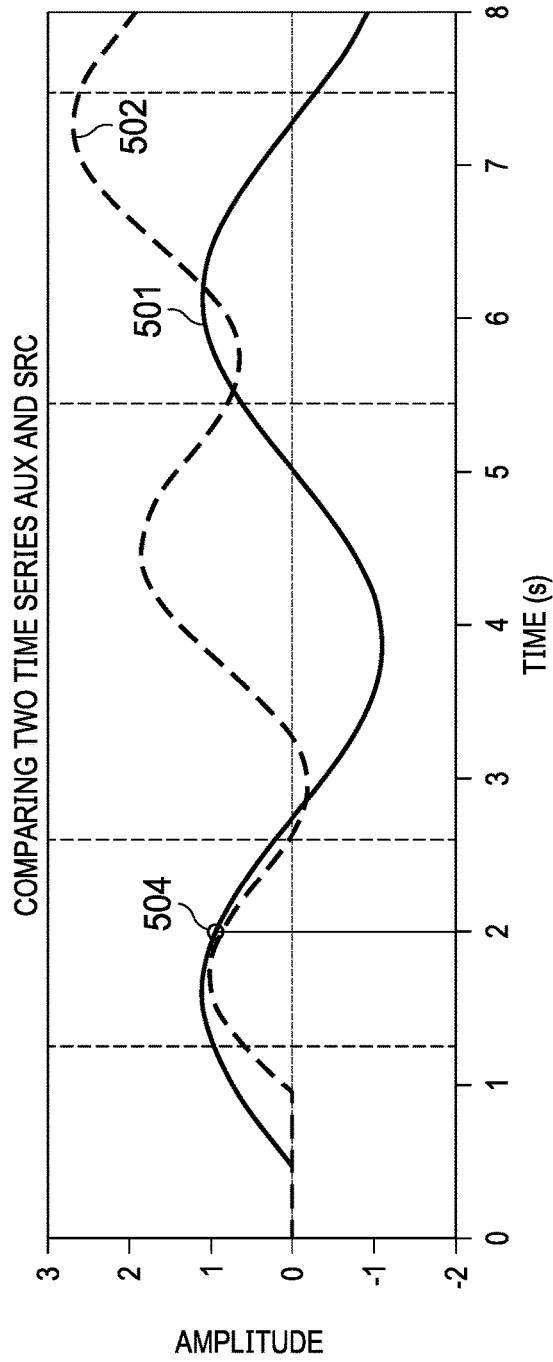
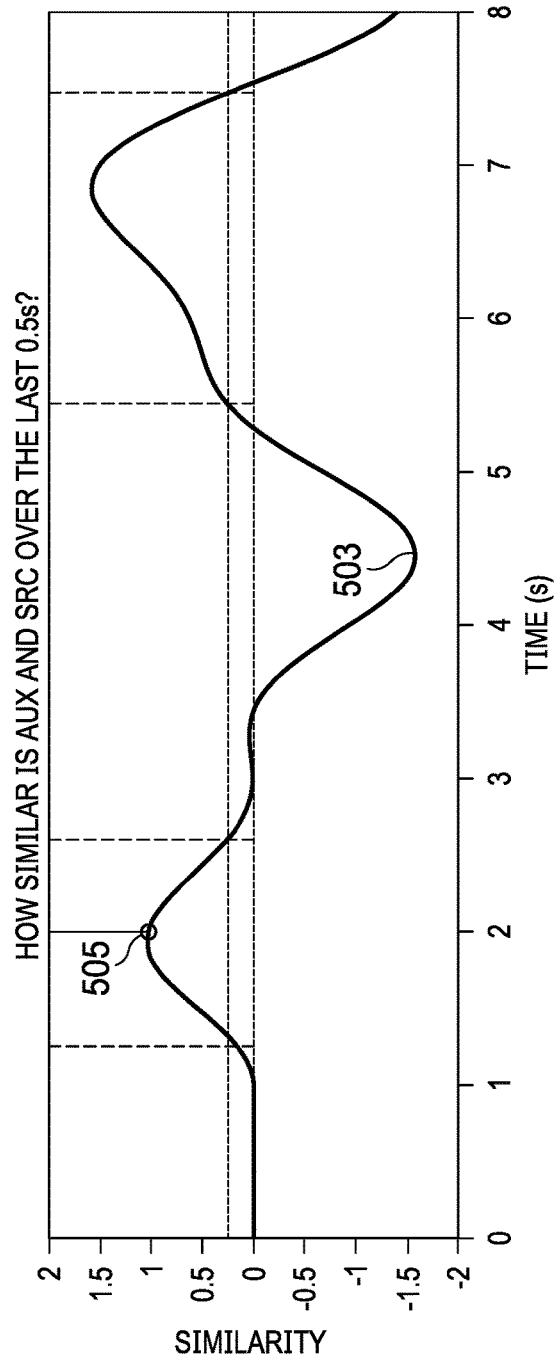

USER POSTURE CHANGE DETECTION FOR HEAD POSE TRACKING IN SPATIAL AUDIO APPLICATIONS

CROSS-REFERENCE TO RELATED APPLICATION

This application claims priority to U.S. Provisional Patent Application No. 63/041,815, filed Jun. 19, 2020, the entire contents of which are incorporated herein by reference.

TECHNICAL FIELD

This disclosure relates generally to head pose tracking for spatial audio applications.

BACKGROUND

Spatial audio creates a three-dimensional (3D) virtual auditory space that allows a user wearing a headset to pinpoint where a sound source is located in the 3D virtual auditory space, while watching a movie, playing a video game or interacting with augmented reality (AR) content on a source device (e.g., a computer screen). Existing spatial audio platforms include a head pose tracker that uses a video camera to track the head pose of a user. If the source device is a mobile device (e.g., smartphone, tablet computer), then the source device and the headset are free to move relative to each other, which may adversely impact the user's perception of the 3D spatial audio.

SUMMARY

Embodiments are disclosed for detecting user posture change events for head pose tracking in spatial audio applications.

In an embodiment, a method comprises: obtaining, using one or more processors of a source device, source device motion data from a source device and headset motion data from a headset worn by a user; estimating, using the one or more processors of the source device, a gravity vector from the motion data; splitting, using the one or more processors, the source device and headset motion data into vertical and horizontal planes, the vertical plane in the direction of the estimated gravity vector and the horizontal plane perpendicular to the estimated gravity vector; calculating, using the one or more processors, similarity measures based on the source device motion data and headset motion data in the vertical and horizontal planes over a time window; detecting, using the one or more processors, a user posture change event based on the calculated similarity measures; and resetting, using the one or more processors, a head tracking error after the user posture change event.

In an embodiment, the user posture change event is detected when there is a sustained rotation and translation similarity over the time window.

In an embodiment, the detected user posture change event signals a start and stop of the user posture change event.

In an embodiment, the user posture change event starts when the user stands up from a seated position and ends when the user starts walking.

In an embodiment, each similarity measure is compared to a threshold value plus a baseline value.

In an embodiment, the threshold is adaptive based on a history of similarity detections.

In an embodiment, the baseline value is a moving average of the particular similarity computed over the time window.

In an embodiment, detecting a user posture change event based on the calculated similarity measures further comprises: determining whether at least one vertical or horizontal translation similarity measure exceeds a first threshold; determining whether at least one of vertical or horizontal rotation similarity measure exceeds a second threshold; and in accordance with determining that the at least one of vertical or horizontal translation similarity measure exceeds the first threshold, and the at least one vertical or horizontal rotation similarity measure exceeds the second threshold, detecting the user posture change event.

In an embodiment, the method further comprises transitioning, using the one or more processors, a state machine from a tracking state to a user posture change event or vice-versa.

In an embodiment, the source device is a mobile device configured to present visual content synchronized with spatial audio played through the headset.

In an embodiment, a system comprises: one or more processors; memory storing instructions that when executed by the one or more processors, cause the one or more processors to perform operations comprising: obtaining, using one or more processors of a source device, source device motion data from a source device and headset motion data from a headset worn by a user; estimating, using the one or more processors of the source device, a gravity vector from one of the source device or headset motion data; splitting, using the one or more processors, the source device and headset motion data into vertical and horizontal planes, the vertical plane in the direction of the estimated gravity vector and the horizontal plane perpendicular to the estimated gravity vector; calculating, using the one or more processors, similarity measures based on the source device motion data and headset motion data in the vertical and horizontal planes over a time window; detecting, using the one or more processors, a user posture change event based on the calculated similarity measures; and resetting a head pose tracker error after the detected user posture change event.

Other embodiments can include an apparatus, computing device and non-transitory, computer-readable storage medium.

Particular embodiments disclosed herein provide one or more of the following advantages. The disclosed embodiments allow a user to hear spatial audio content at any desired viewing position (e.g., sitting down, standing, lying down, walking), such that audio (e.g., speech dialogue) originating from a center channel of a 3D virtual auditory space is perceived by the user as originating from a source device. Additionally, detecting during user posture change events provides an opportunistic correction of head pose tracking error that could impair the experience of the user.

The details of one or more implementations of the subject matter are set forth in the accompanying drawings and the description below. Other features, aspects and advantages of the subject matter will become apparent from the description, the drawings and the claims.

BRIEF DESCRIPTION OF THE DRAWINGS

FIG. 5A shows two time series of amplitude data compared over a time window, according to an embodiment.

FIG. 5B shows similarity measures for the two time series of amplitude data shown in FIG. 5A, according to an embodiment.

DETAILED DESCRIPTION

Example Systems

Figure 1:
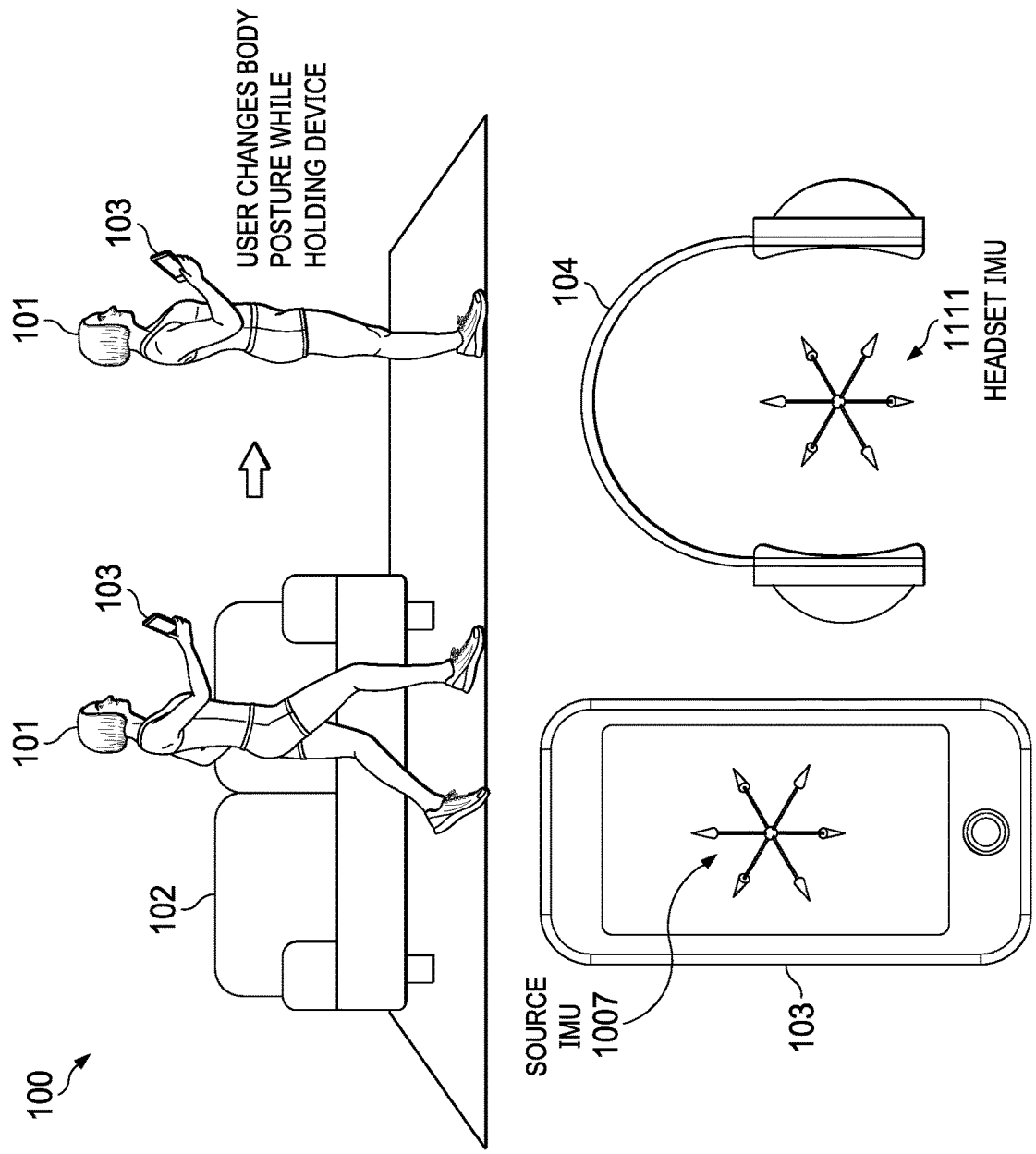
FIG. 1 illustrates an exemplary user posture change event, according to an embodiment.

FIG. 1 illustrates an example user posture change event, according to an embodiment. In the example shown, user 101 is viewing a visual portion of AV content displayed on source device 103 while sitting on couch 102. User 101 is wearing a headset 104 that is wirelessly coupled to source device 103. Headset 104 includes stereo loudspeakers that output rendered spatial audio (e.g., binaural rendered audio) content generated by source device 103. A user posture change event occurs when user 101 stands up from a seated position on couch 102 and begins walking with source device 103 in her hands while still viewing the content displayed on source device 103.

The user posture change event described above occurs briefly and includes the simultaneous presence of correlated and uncorrelated motion that causes tracking error drift that persists until the error can be corrected with measurements, such as a face anchor pose provided by a face detector that detects the position and orientation of a face in video output of a front-facing camera embedded in or attached to source device 103. This persistent head pose tracking error impairs the user experience by causing the spatial audio to no longer be "centered," as described in reference to FIG. 2. Other examples of user posture change events include but are not limited to the user picking up a source device from a table and walking away with the source device, the user sitting on a couch and then lying down on the couch while holding the source device or the user rolling over in bed while holding the source device.

In the examples that follow, source device 103 includes any device capable of playing AV content and can be wired or wirelessly coupled to headset 104, including but not limited to a smartphone, tablet computer, laptop computer, wearable computer, game console, television, etc. In an embodiment, source device 103 includes the architecture 1000 described in reference to FIG. 10. The architecture 1000 includes inertial measurement unit (IMU) 1007 that includes various motion sensors, including but not limited to angular rate sensors (e.g., 3-axis MEMS gyro) and accelerometers (e.g., 3-axis MEMS accelerometer). When source device 103 is moved or rotated, the motion sensors detect the motion. The outputs of IMU 1007 are processed into rotation and acceleration data in an inertial reference frame. In an embodiment, source device 103 outputs AV content, including but not limited to augmented reality (AR), virtual reality (VR) and immersive video content. Source device 103 also includes an audio rendering engine (e.g., a binaural rendering engine) that simulates the main audio cues humans use to localize sounds including interaural time differences, interaural level differences, and spectral filtering done by the outer ears.

Headset 104 is any device that includes loudspeakers for projecting acoustic audio, including but not limited to: headsets, earbuds, ear phones and loudspeakers (e.g., smart speakers). In an embodiment, headset 104 includes the architecture 1100 described in reference to FIG. 11. The architecture includes IMU 1111 that includes various motion sensors, including but not limited to angular rate sensors (e.g., 3-axis MEMS gyro) and accelerometers (e.g., 3-axis MEMS accelerometer). When user 101 translates or rotates her head, the motion sensors in IMU 1111 detect the motion. The outputs of the headset motion sensors are processed into rotation and acceleration data in the same inertial reference frame as the rotation and acceleration output by IMU 1007 of source device 103.

Figure 2:
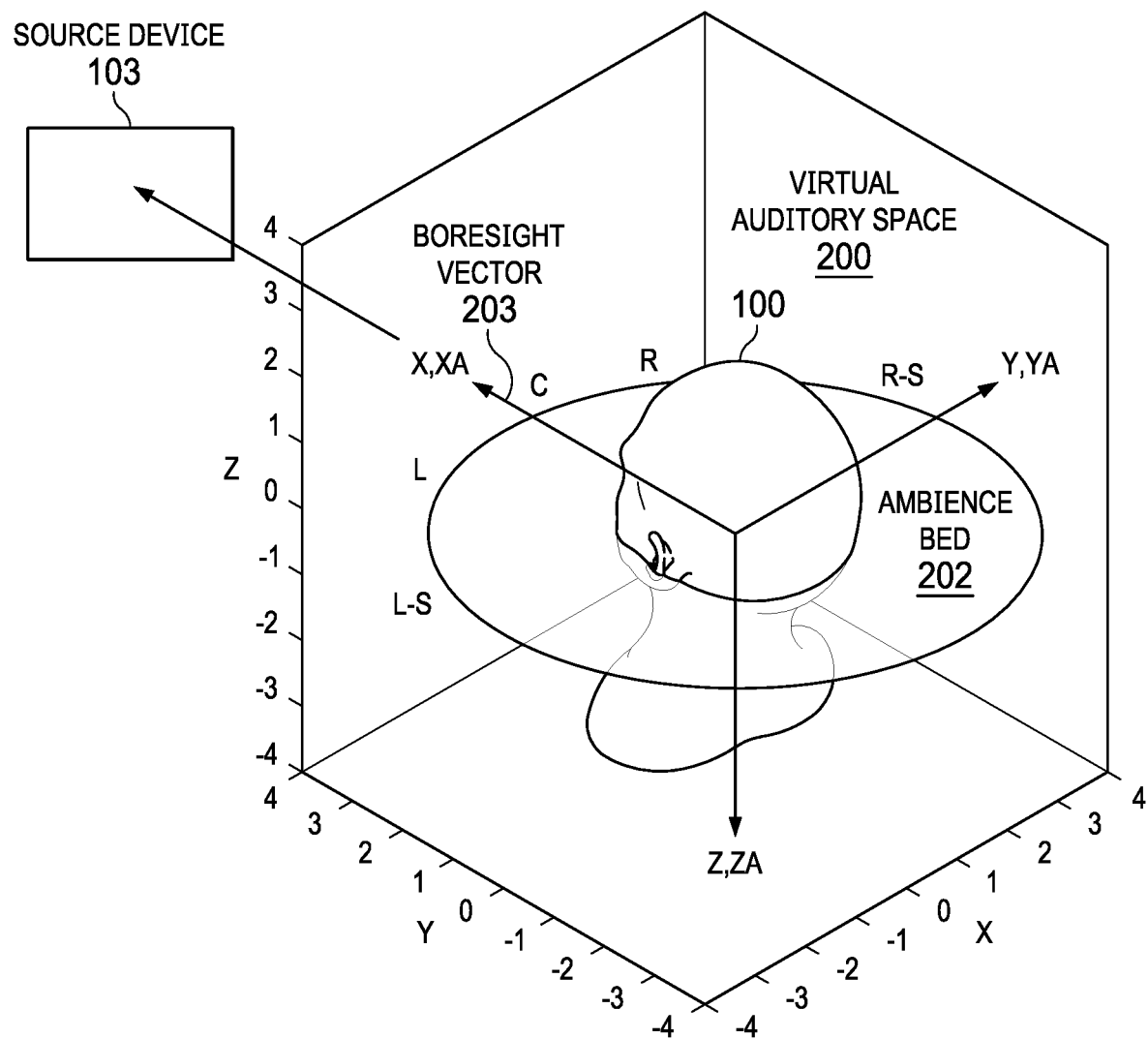
FIG. 2 illustrates the centering of a 3D virtual auditory space, according to an embodiment.

FIG. 2 illustrates a centered and inertially stabilized 3D virtual auditory space 200, according to an embodiment. The virtual auditory space 200 includes virtual sound sources or "virtual speakers" (e.g., center (C), Left (L), Right (R), left-surround (L-S) and right-surround (R-S)) that are rendered in ambience bed 202 using known spatial audio techniques, such as binaural rendering. To maintain the desired 3D spatial audio effect, it is desired that the center channel (C) be aligned with a boresight vector 203. The boresight vector 203 originates from a headset reference frame and terminates at a source device reference frame. When the virtual auditory environment is first initialized, the center channel is aligned with boresight vector 203 by rotating a reference frame for the ambience bed 202 ($X_A$, $Y_A$, $Z_A$) to align the center channel with boresight vector 203, as shown in FIG. 2. This alignment process causes the spatial audio to be "centered." When the spatial audio is centered, user 201 perceives audio from the center channel (e.g., spoken dialogue) as coming directly from the display of source device 103. If the user rotates her head in a face-forward position looking at the display of source device 101, boresight vector 203 does not change and the spatial audio remains centered. If, however, boresight vector 203 changes, e.g., due to the source device and headset reference frames rotating relative to a global reference frame (e.g., the earth under the user's feet), then the spatial audio becomes "uncentered" and user 201 no longer perceives the center channel audio as coming from the display of source device 103. When this condition is detected, the spatial audio is "re-centered" to the updated boresight vector 203. In an embodiment, boresight vector 203 is estimated using an extended Kalman filter, as described in Appendix A.

Note that ambience bed 200 shown in FIG. 2 is for a 5.1 audio format, where all audio channels are located in an $X_A$-$Y_A$ plane of ambience bed 202 ($Z_A$=0), where $X_A$ is forward towards the center channel, $Y_A$ is right an $Z_A$ is down. Other embodiments, can have more or fewer audio channels, and the audio channels can be placed at different locations in 3D virtual auditory space, including other planes (other ambience beds) above or below the $X_A$-$Y_A$ plane. In an embodiment, during tracking the $X_A$-$Y_A$ plane of ambience bed 202 is rolled about boresight vector 203 to align with an estimated gravity direction (determined during initialization) in the user's head frame. This ensures that the surround channels are fixed in space and do not tilt up and down as the user rolls her head around.

Figure 3:
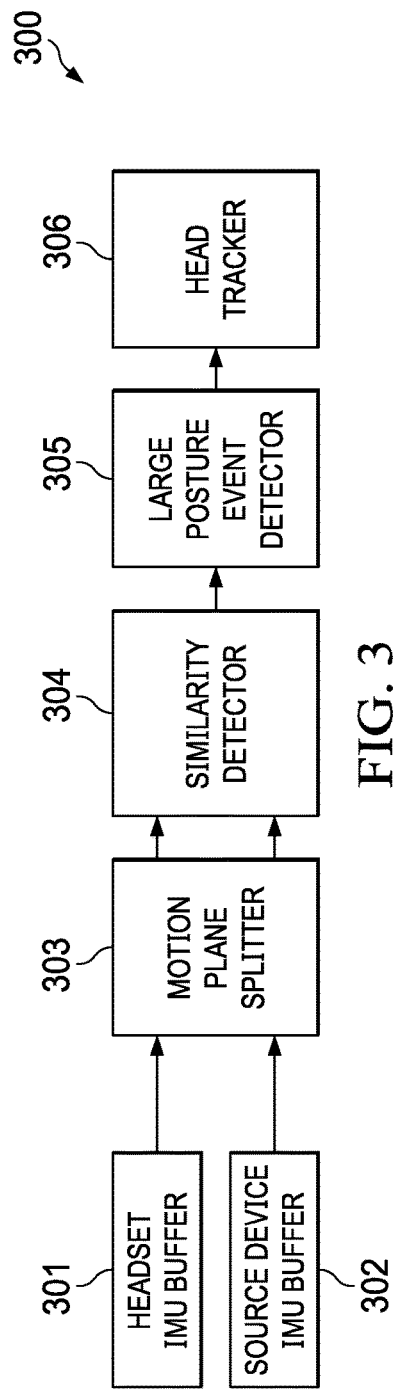
FIG. 3 is a block diagram of a system for detecting user posture change events, according to an embodiment.

FIG. 3 is a block diagram of a user posture event detection system 300, according to an embodiment. System 300 includes headset IMU buffer 301, source device IMU buffer 302, motion plane splitter 303, similarity detector 304, user posture change event detector 305 and head tracker 306.

Motion data (e.g., rotation rate and acceleration) measured by IMU 1111 in headset 104 is transmitted to source device 103 and stored in headset IMU buffer 301. Motion data measured by IMU 1007 in source device 103 (e.g., rotation rate and acceleration) is stored in source device IMU buffer 302. Motion plane splitter 303 splits the rotation rate and acceleration data from buffers 301, 302 into vertical and horizontal plane components. The vertical plane is along an estimated gravity vector and the horizontal plane is perpendicular to the vertical plane. The gravity vector (estimated measured acceleration due to gravity) can be estimated from the acceleration data measured by IMU 1007 of source device 103 using known techniques. In an embodiment, the rotation and acceleration data in headset IMU buffer 301 and source device IMU buffer 302 is transformed into the same inertial reference frame prior to splitting the motion data into the two planes. The vertical and horizontal plane components of the rotation rate and inertial acceleration are input into similarity detector 304.

During a user posture change event, there is significant mutual motion of source device 103 and headset 104 in the same direction. Similarity detector 304 compares the motion data in both planes over a window of time using similarity measures, a described in further detail in reference to FIGS. 5-9. The similarity measurements indicate how closely the rotations and accelerations from the respective IMUs of source device 103 and headset 104 track each other.

User posture change event detector 305 receives the similarity measurements and detects a user posture change event. A user posture change event is detected when the similarity measures indicate a sustained rotation and translation similarity over a specified time window (e.g., 10 seconds). If there is a sustained rotation and translation similarity over the specified time window, a user posture change event is detected.

Head tracker 306 receives a user posture change event signal from user posture change event detector 305. The user posture change event signal indicates the start and stop of a user posture change event. In the example user posture change event illustrated in FIG. 1, a user posture change detection starts when user 101 stands up from couch 102 and ends when the user starts walking with source device 103 in her hands and wearing headset 104. In response to receiving the user posture change event signal from the user posture change event detector 305, head tracker 306 resets the head tracking error, as previously described.

Figure 4:
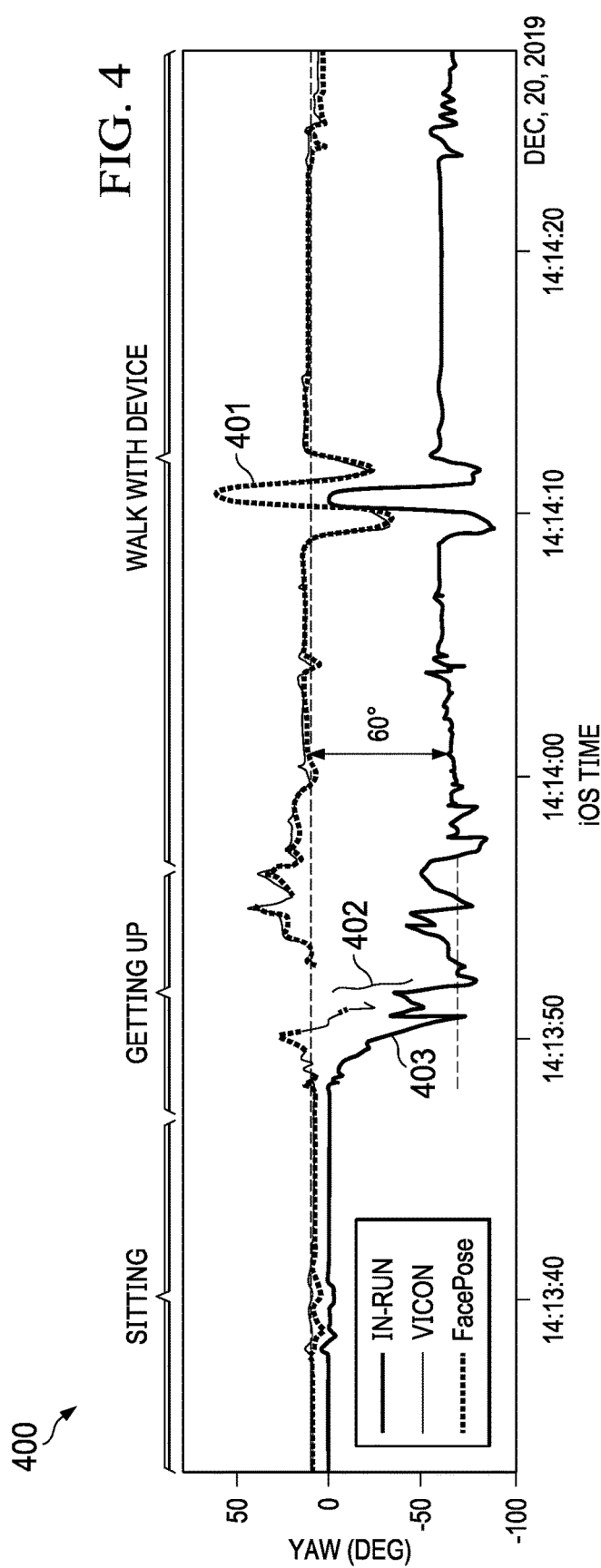
FIG. 4 are plots illustrating yaw tracking error for various phases of the user posture change event illustrated in FIG. 1, according to an embodiment.

FIG. 4 are plots illustrating yaw tracking error for various phases of the user posture change event illustrated in FIG. 1, according to an embodiment. Plot 401 is a ground truth yaw angle, plot 402 is the yaw angle with user posture change detection enabled and plot 403 is the yaw angle with user posture change detection not enabled. The ground truth yaw angle is determined by, for example, a face detector in source device 103 that detects the position and orientation of a user's face in a camera reference frame. Correction of boresight 204 during the Getting Up phase largely removes the 60 degree yaw tracking error. Because the tracking error was removed during the Getting Up phase, the spatial audio is centered on the updated estimated boresight 204, rather than being centered on the estimated boresight with 60 degrees of yaw tracking error.

Continuing with user posture change event 100 of FIG. 1, plots 401-403 transition through three phases: Sitting, Getting Up and Walk With Device, as indicated by the labels at the top of the figure. In the Sitting phase, plots 402, 403 track closely ground truth plot 401 with only a small error (e.g., due to noise). In the Getting Up phase, when the user gets up from couch 102, plots 402, 403 deviate substantially (e.g., by 60 degrees) from the ground truth plot 401. In the Walk With Device phase, plot 403 continues to deviate substantially from the ground truth plot 401. However, plot 402 again closely tracks the ground truth plot angle.

Comparing IMU Data

To detect similarity between source device and headset IMU motion data, user posture change characteristics are defined as overlapping "similar" motion between source device 103 and headset 104 in one direction. Thus, three user posture change characteristics are analyzed: direction, overlapping and similarity. For direction, the motion data from the IMUS (rotation rate, acceleration) is split into vertical and horizontal plane components in an inertial frame using the estimated gravity vector to define the planes, as described above in reference to FIG. 3. For overlapping, sustained motion is evaluated over a moving time window (e.g., 0.5 seconds). For similarity, the system evaluates translation and rotation motion in the same direction to detect large amplitude changes with respect to a baseline amplitude.

As a first step, the system determines if the source device and headset have a large enough angle change and velocity change to classify the motion data as a user posture change. As stated above, the system splits rotation rate and acceleration data stored in IMU buffers 301, 302 into vertical and horizontal plane components using the estimated gravity. The rotation rate and acceleration is then integrated over a moving window to obtain rotation and velocity data. Similarity between the rotation data and velocity data is determined using a dot product operation on the rotation and velocity vectors. This results in four similarity measurements: 1) vertical rotation similarity; 2) horizontal rotation similarity; 3) vertical translation similarity; and 4) horizontal translation similarity, stated mathematically as:

$$S_Z^\theta = \Delta\theta_{Z,src}^I \cdot \Delta\theta_{Z,hdst}^I, \qquad [1]$$

$$S_{XY}^\theta = \Delta\theta_{XY,src}^I \cdot \Delta\theta_{XY,hdst}^I, \qquad [2]$$

$$S_Z^v = \Delta v_{Z,src}^I \cdot \Delta v_{Z,hdst}^I, \qquad [3]$$

$$S_{XY}^v = \Delta v_{XY,src}^I \cdot \Delta v_{XY,hdst}^I. \qquad [4]$$

The notation for Equations [1]-[4] is as follows: "·" is the dot product operator, Z the vertical component unit vector along the gravity component, XY is the horizontal component unit vector orthogonal to the estimated gravity vector (we look at the amplitude (magnitude) since north is ambiguous), Δθ is the angle change computed by integrating angular rate over a time window, Δv is the velocity change computed by integrating the acceleration over a time window (which can be the same different than the time window for the angular rate integration).

FIG. 5A shows two time series of amplitude data 501, 502 compared over a time window, according to an embodiment. Note that the amplitude 504 at 2 seconds is approximately the same for both time series amplitude data. FIG. 5B shows a time series of similarity data 503 generated by inputting a window of the time series of data 501, 502 into a similarity function (e.g., the dot product operation). Note the similarity measure 505 of 1.0 at T=2.0 seconds.

Figure 5C:
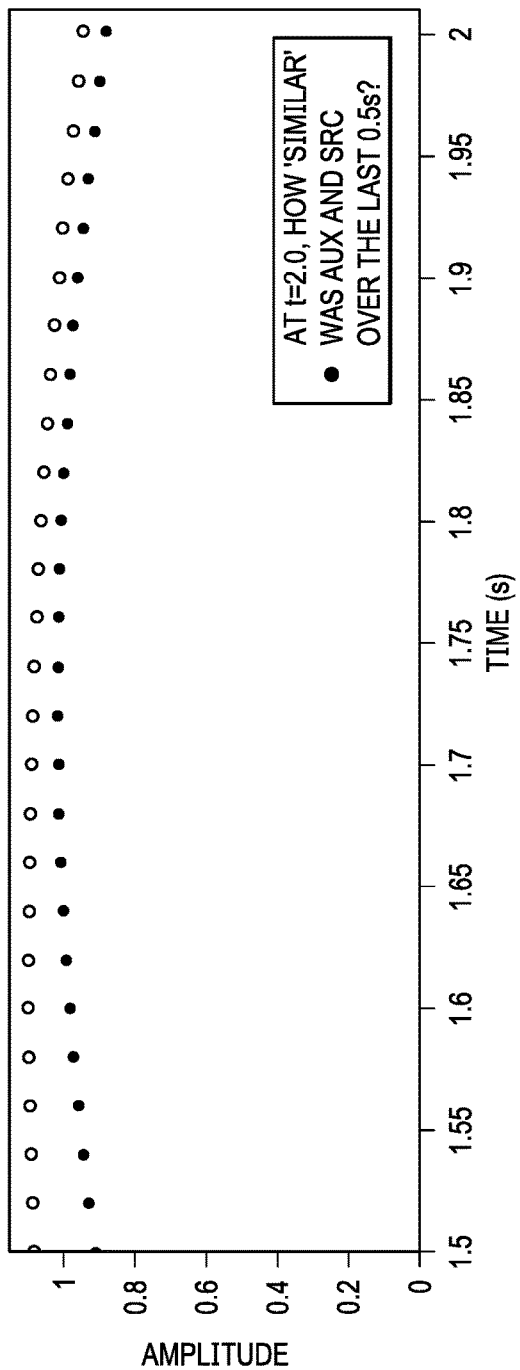
FIGS. 5C and 5D illustrate a dot product similarity measure, according to an embodiment.
Figure 5D:
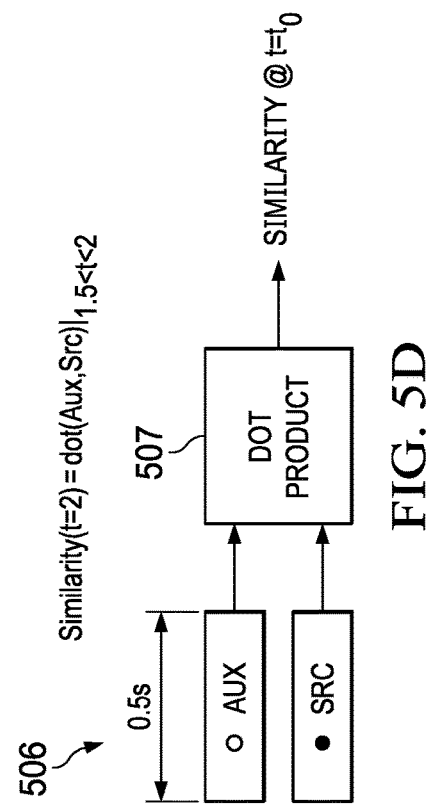

FIGS. 5C and 5D illustrate a dot product similarity measure, according to an embodiment. FIG. 5C shows a plot of similarity data computed by the dot product operation of FIG. 5D over a 0.5 second window 506. FIG. 5D illustrates the dot product operation 507 to determine the similarity at t=t0. Here, "Aux" (auxiliary device) and "Src" (source device) are vectors of headset motion data and source device motion data, respectively, compared within a 0.5 second window.

Figure 6C:
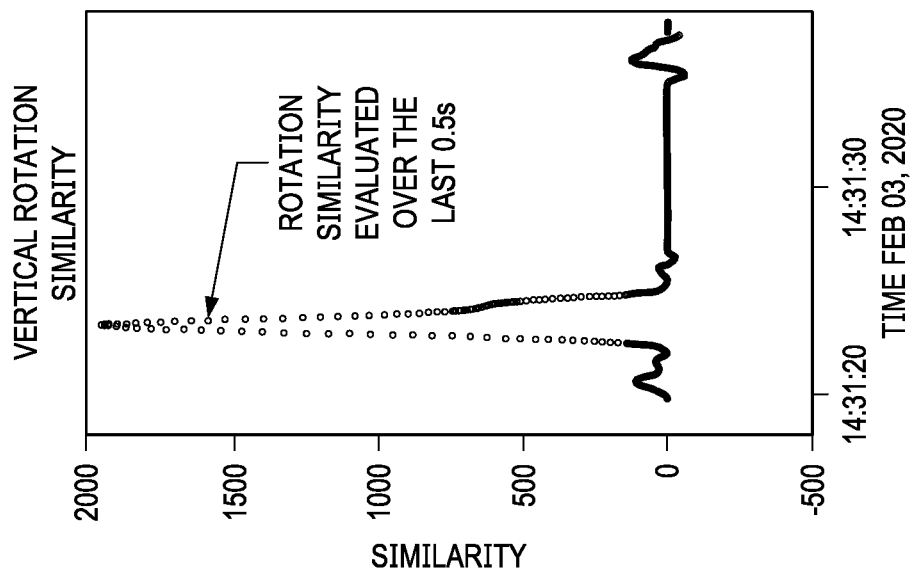
FIGS. 6A-6C are plots illustrating computation steps for detecting user posture change events, according to an embodiment.
Figure 6B:
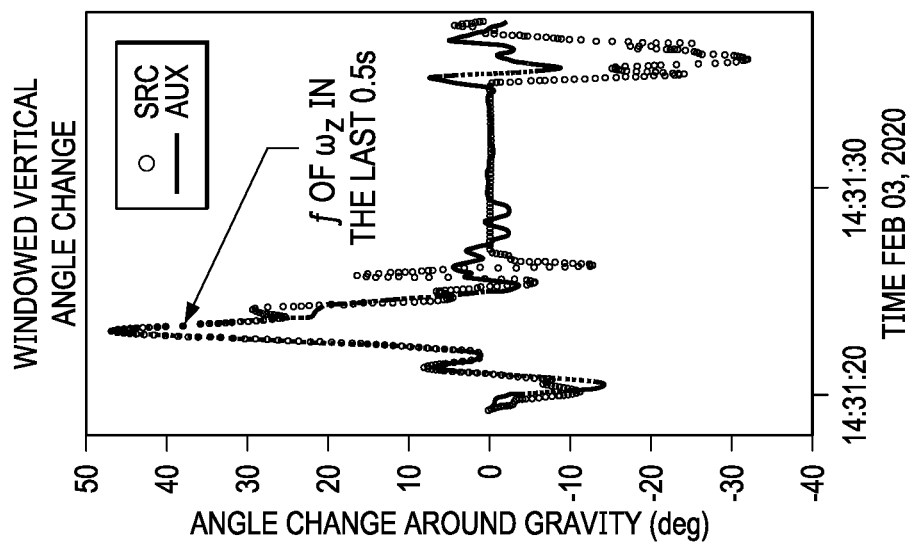
Figure 6A:
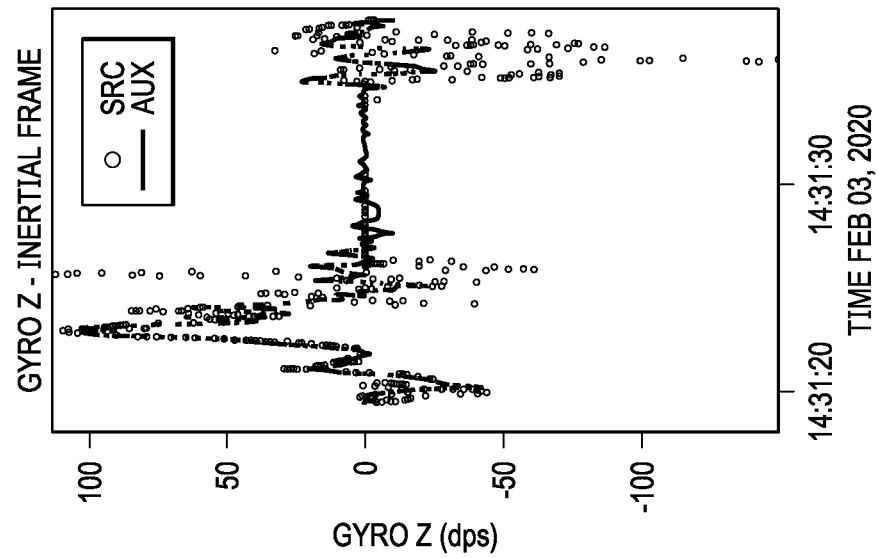

FIGS. 6A-6C are plots illustrating computation steps for detecting user posture changes, according to an embodiment. FIG. 6A shows angular rate data (deg/sec) over time in an inertial reference frame for the source and auxiliary devices. The angular rate data is split into vertical and horizontal planes using an estimated gravity vector, and then integrated over a 0.5 second window, to produce the windowed vertical angle change shown in FIG. 6B. FIG. 6C shows the vertical rotation similarity over the window which is generated by computing a dot product of the windowed vertical angle change data for the source device and headset/auxiliary device.

Figure 7A:
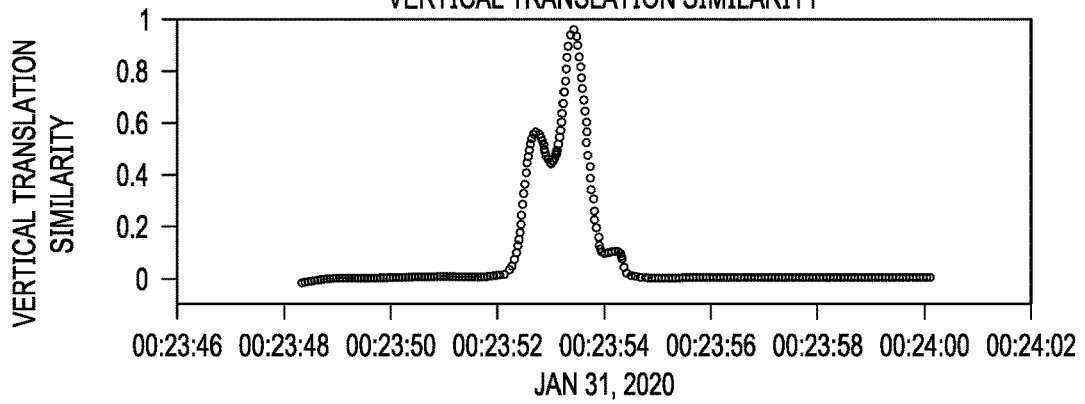
FIGS. 7A-7C are plots illustrating similarity measures for various phases of the user posture change event illustrated in FIG. 1, according to an embodiment.
Figure 7A:
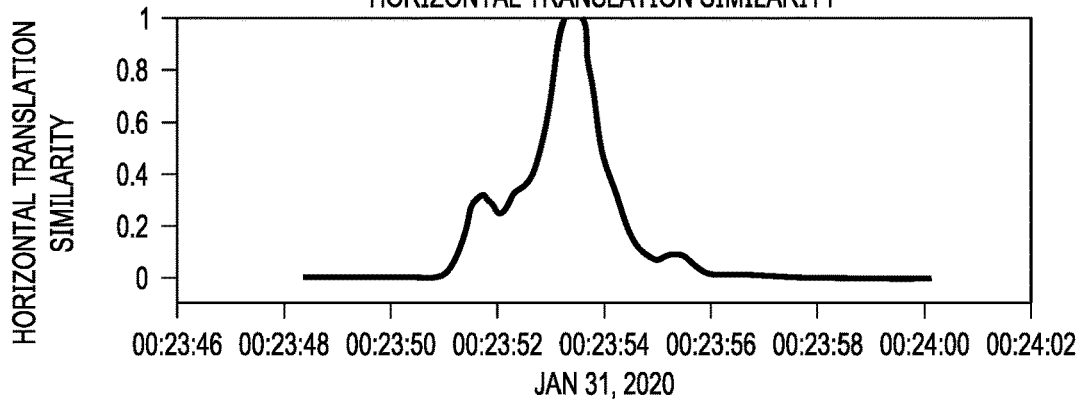
Figure 7A:
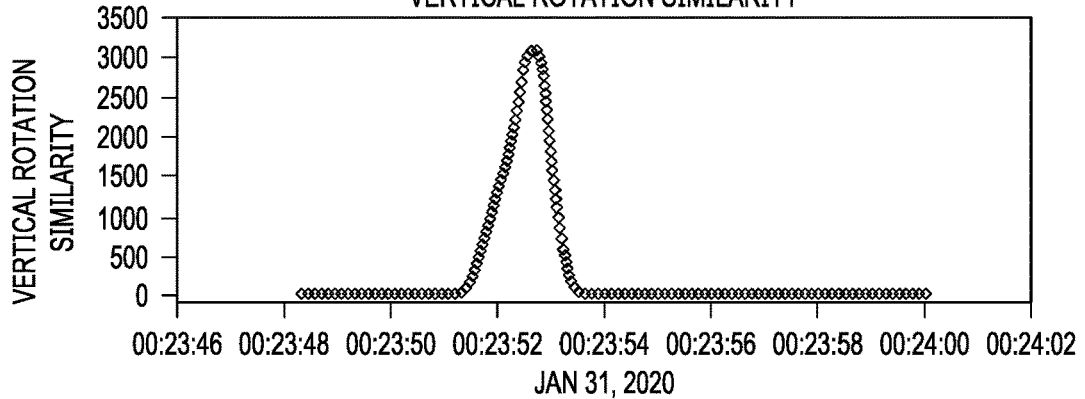
Figure 7A:
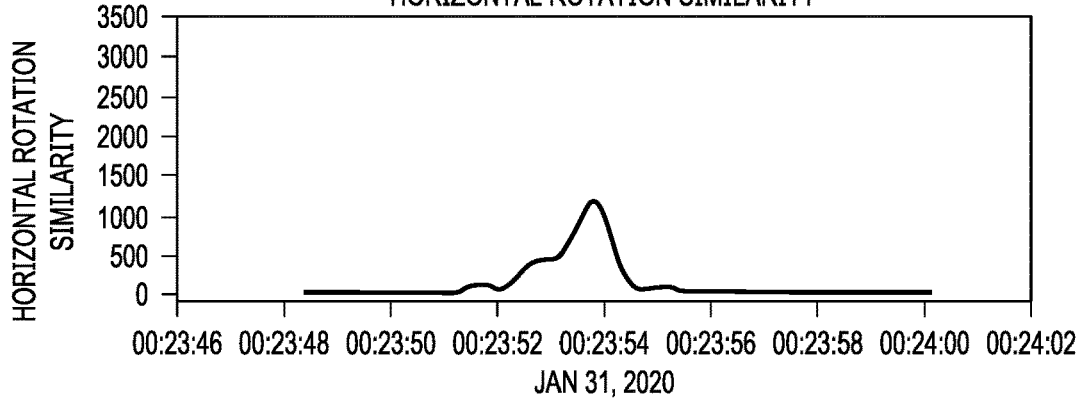
Figure 7B:
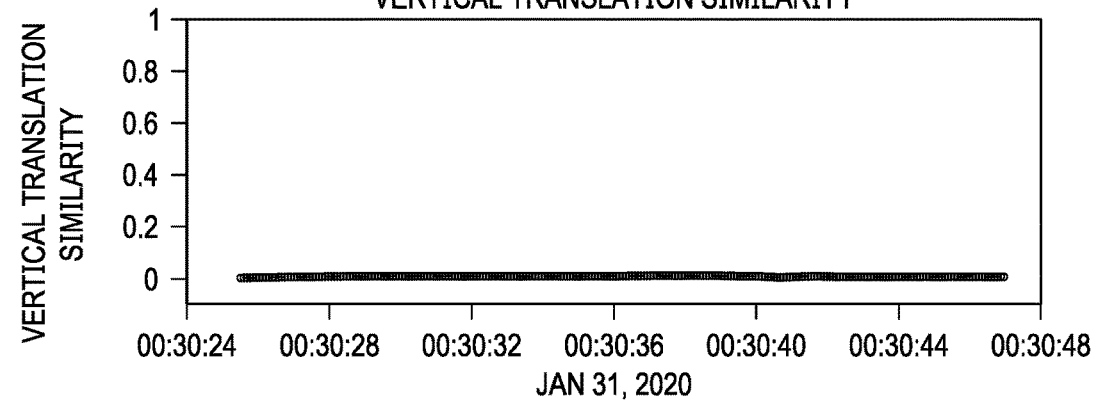
Figure 7B:
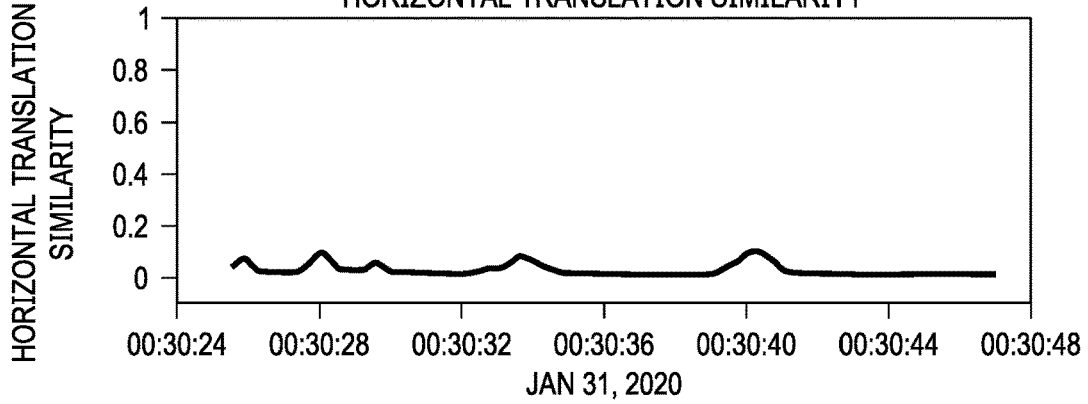
Figure 7B:
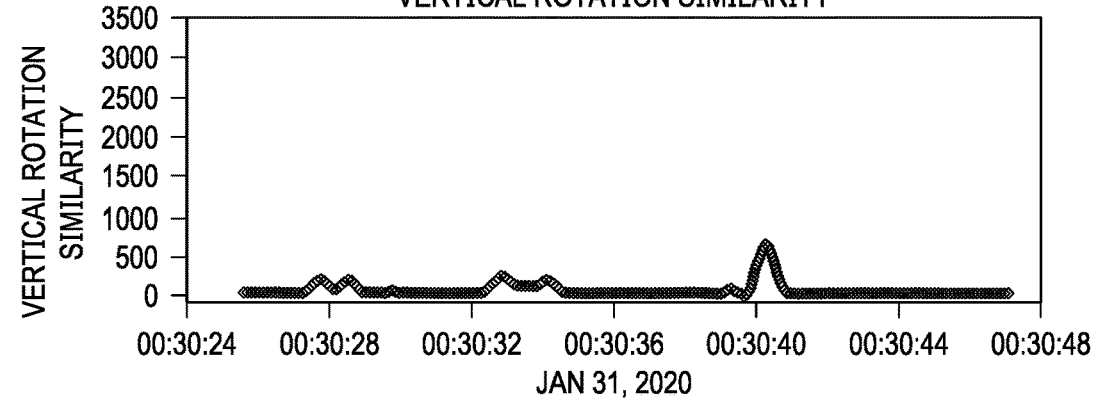
Figure 7B:
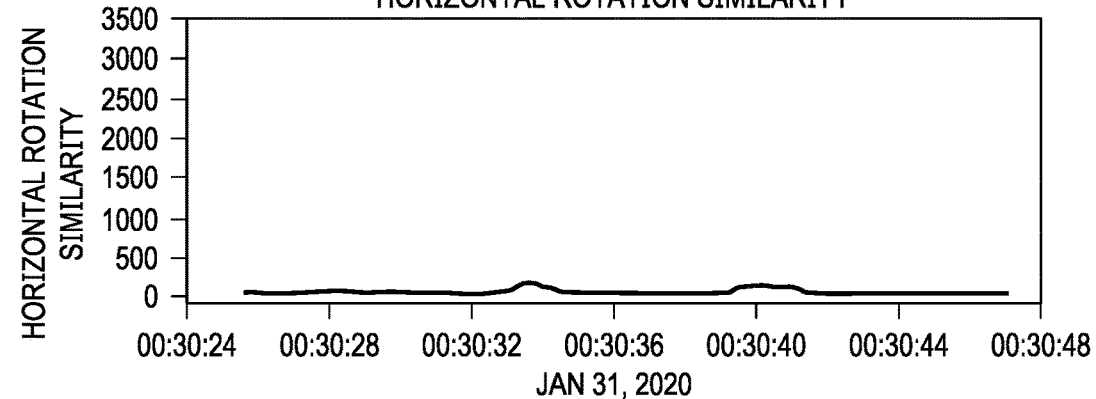
Figure 7C:
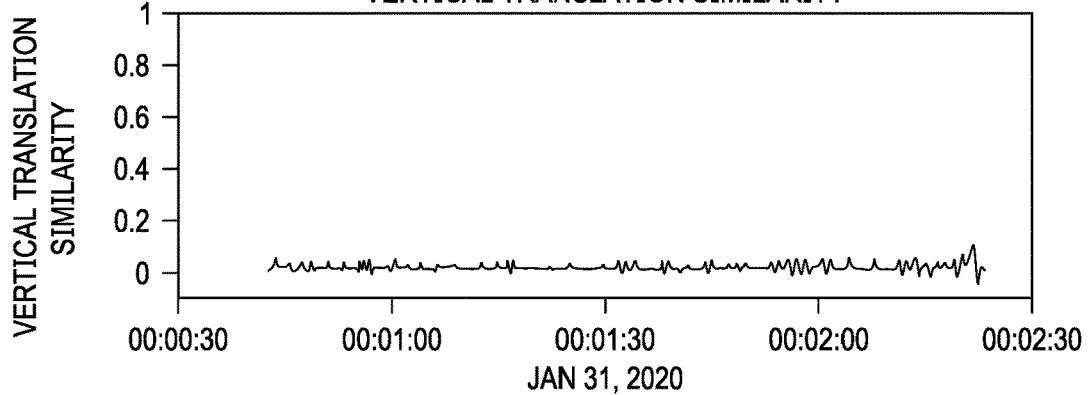
Figure 7C:
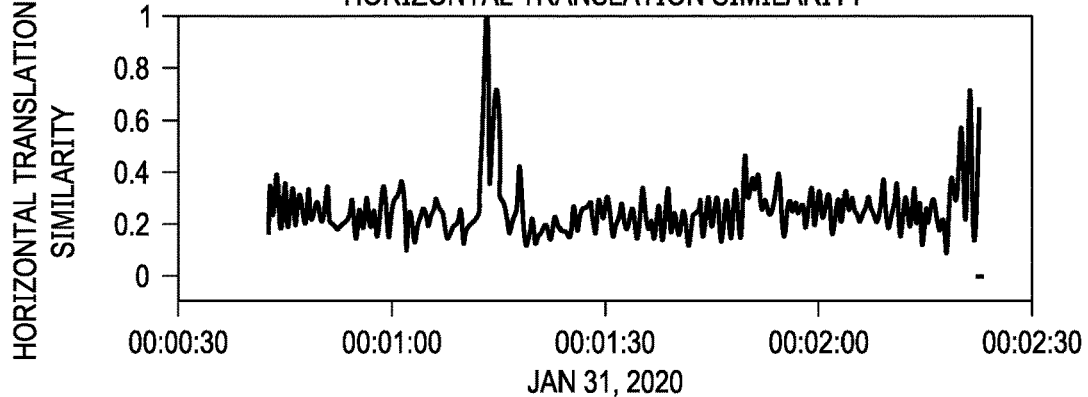
Figure 7C:
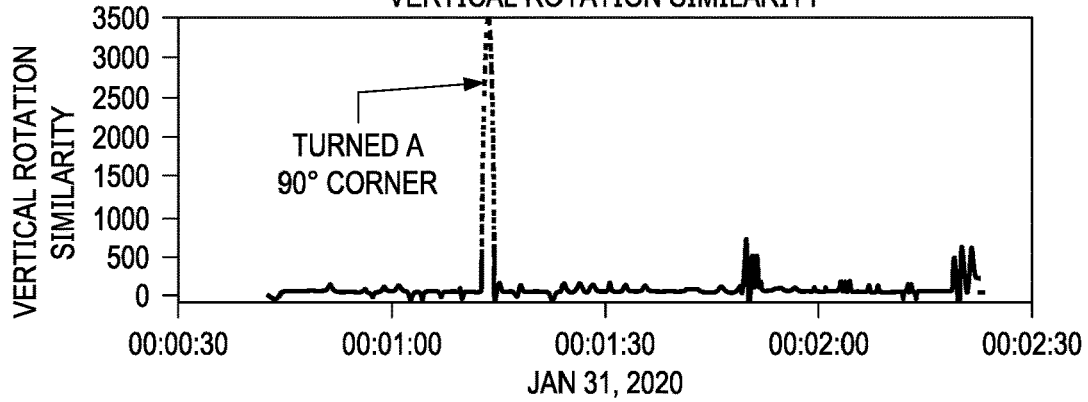
Figure 7C:
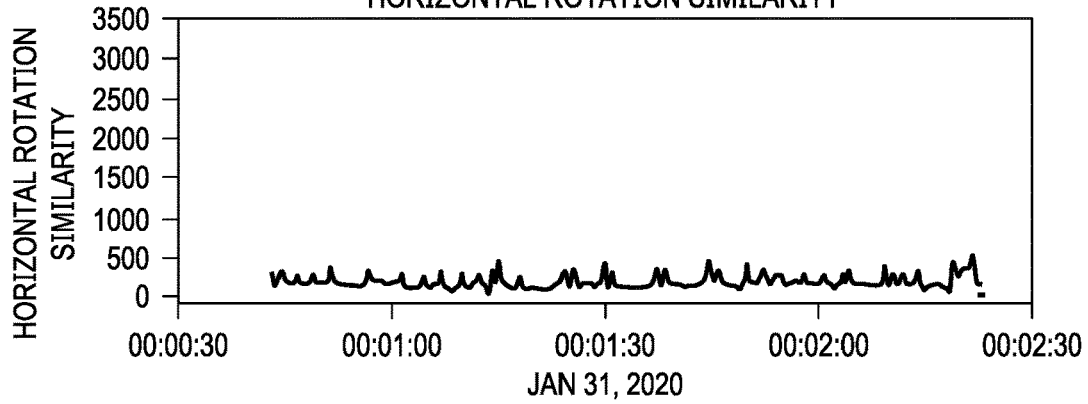

FIGS. 7A-7C are plots illustrating similarity measures for various phases of the user posture change event illustrated in FIG. 1, according to an embodiment. FIG. 7A shows the vertical, horizontal translation and rotation similarities computed using Equations [1]-[4] when the user moves from a seated position on a couch to standing position. FIG. 7B shows the vertical, horizontal translation and rotation similarities computed using Equations [1]-[4] when the user is couch shuffling. FIG. 7C shows the vertical, horizontal translation and rotation similarities computed using Equations [1]-[4] when the user is walking with the source device.

Note the peak in the vertical rotation similarity when the user turns a 90 degree corner while walking with the device. There is also a peak at the same time in the horizontal translation similarity due to a tangential component of rotational acceleration sensed by the IMU. Note that users sometimes suffer tracking error when turning 90 degrees while walking with the source device in their hand. Although turning 90 degrees is not a large posture change, such motion can be used to bound the error by triggering a correction to the boresight vector estimate.

Figure 8A:
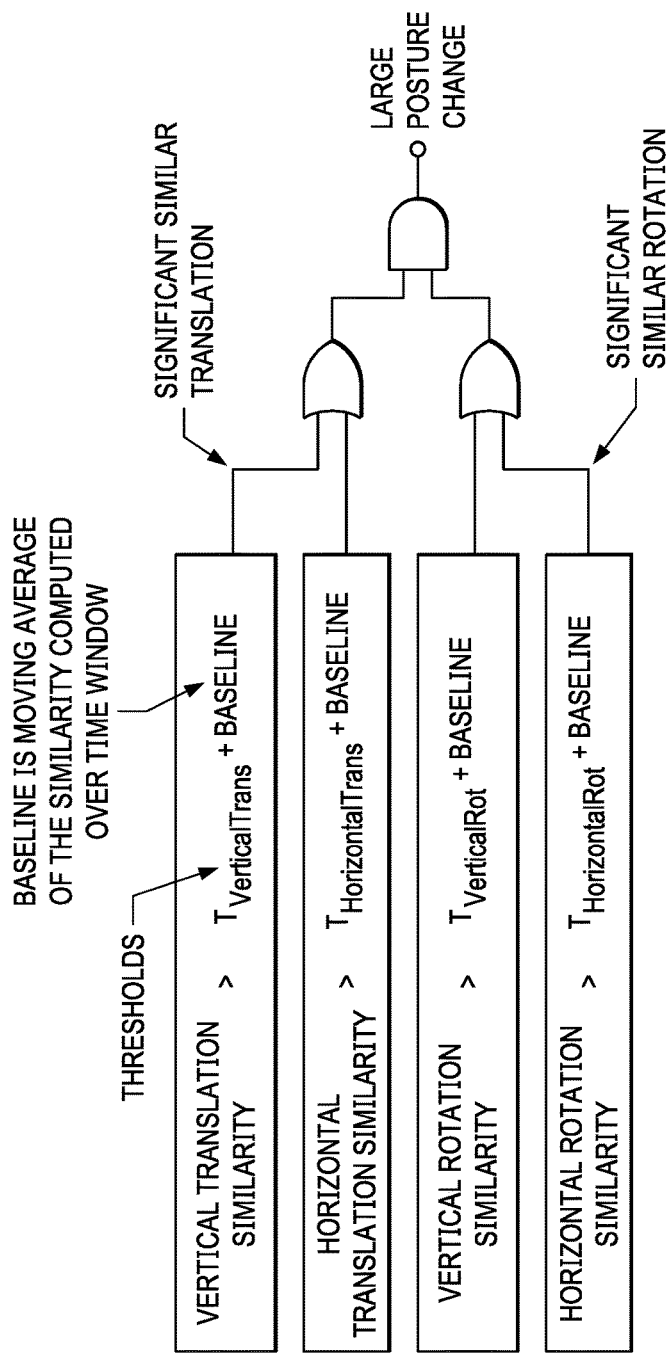
FIGS. 8A and 8B are logic and state diagrams, respectively, for detecting user posture change events, according to an embodiment.
Figure 8B:
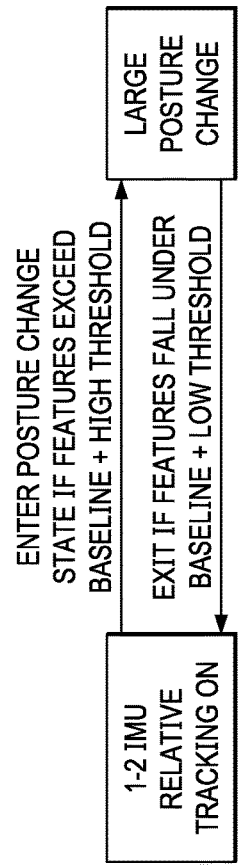

FIGS. 8A and 8B are state flow diagrams for detecting user posture change events, according to an embodiment. More particularly, FIG. 8A shows how the four similarity measures are combined to detect a user posture change event. In an embodiment, each similarity measure is compared to a threshold value plus a baseline value. In an embodiment, the thresholds can be determined empirically, such that only large user posture events (e.g., standing from a seated position) trigger correction of boresight 204, rather than small user posture events (e.g., couch shuffling). In an embodiment, the thresholds can be adaptive based on a history of similarity detections stored in memory of source device 103.

The baseline value can be a moving average of the particular similarity computed over the time window. In the embodiment shown, if at least one of the vertical or horizontal translation similarity measures exceeds its corresponding threshold, and if at least one of the vertical or horizontal rotation similarity measures exceeds its corresponding threshold, then a user posture change event is detected. This is conceptually represented in FIG. 8A using combinational logic symbols. Note that if there is only a significant similar translation or a significant similar rotation, but not both, then a user posture change is not detected.

Referring to FIG. 8B, a simple state machine can be implemented, where a 1-2 IMU tracking state transitions into a user posture change state when the output of the logic shown in FIG. 8A is "1," and the user posture change state transitions back to the 1-2 IMU tracking state when the output is "0." After the user posture change event, head pose tracking error can be reset, as previously described.

Example Processes

Figure 9:
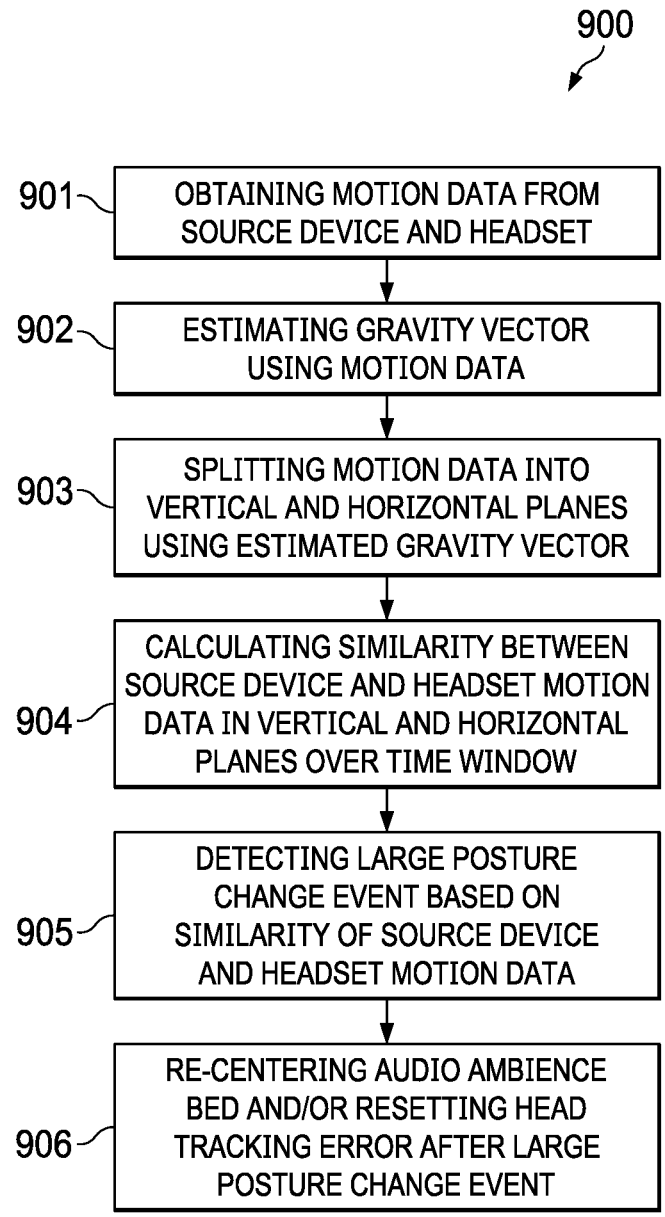
FIG. 9 is a flow diagram of a process of detecting user posture change events, according to an embodiment.

FIG. 9 is a flow diagram of process 900 detecting posture change events during head tracking of a spatial audio application, according to an embodiment. Process 900 can be implemented using, for example, the source device architecture 1000 and headset architecture 1100, as described in reference to FIGS. 10 and 11, respectively.

Process 900 begins by obtaining motion data from a source device and a headset communicatively coupled to the source device (901), estimating a gravity vector using the motion data (902), splitting the motion data into vertical and horizontal planes using the estimated gravity vector. For example, the vertical plane is along the gravity vector and the horizontal plane is perpendicular to the gravity vector, calculating similarity between the source device and headset motion data in the vertical and horizontal planes over a time window (904), detecting a user posture change event based on the similarity of the source device and headset motion data over the time window (905) and, re-centering audio ambiance bed and/or resetting head tracking error (906) after the user posture change.

Example Software/Hardware Architectures

Figure 10:
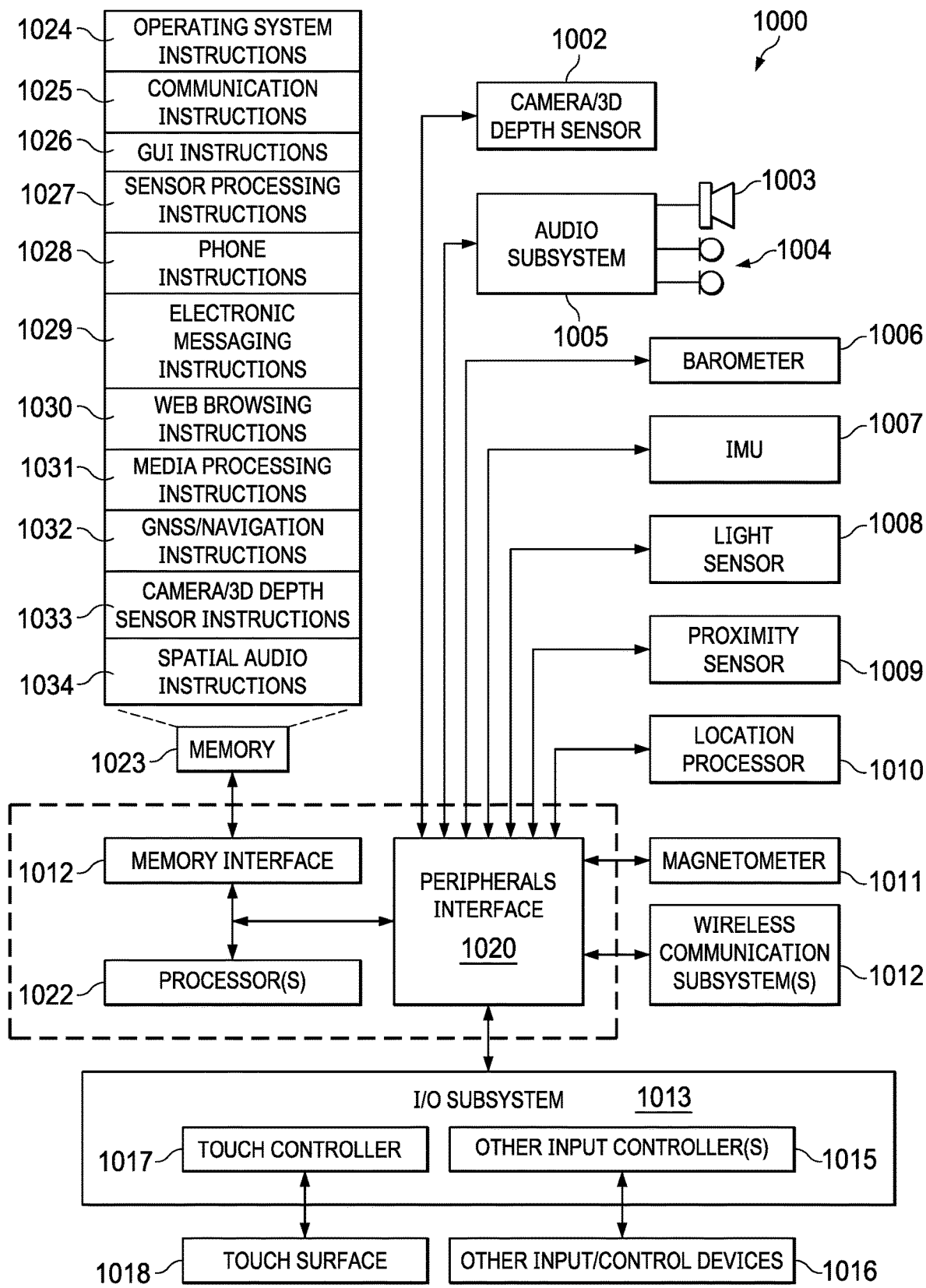
FIG. 10 a block diagram of source device architecture implementing the features and operations described in reference to FIGS. 1-9.

FIG. 10 a conceptual block diagram of source device software/hardware architecture 1000 implementing the features and operations described in reference to FIGS. 1-9. Architecture 1000 can include memory interface 1021, one or more data processors, digital signal processors (DSPs), image processors and/or central processing units (CPUs) 1022 and peripherals interface 1020. Memory interface 1023, one or more processors 1022 and/or peripherals interface 1020 can be separate components or can be integrated in one or more integrated circuits.

Sensors, devices and subsystems can be coupled to peripherals interface 1020 to provide multiple functionalities. For example, IMU 1007, light sensor 1008 and proximity sensor 1009 can be coupled to peripherals interface 1020 to facilitate motion sensing (e.g., acceleration, rotation rates), lighting and proximity functions of the wearable computer. Location processor 1010 can be connected to peripherals interface 1020 to provide geo-positioning. In some implementations, location processor 1010 can be a GNSS receiver, such as the Global Positioning System (GPS) receiver. Electronic magnetometer 1011 (e.g., an integrated circuit chip) can also be connected to peripherals interface 1020 to provide data that can be used to determine the direction of magnetic North. Electronic magnetometer 1011 can provide data to an electronic compass application. IMU 1007 can be an IMU that includes one or more accelerometers and/or gyros (e.g., 3-axis MEMS accelerometer and 3-axis MEMS gyro) configured to determine change of speed and direction of movement of the source device. Barometer 1006 can be configured to measure atmospheric pressure around the mobile device.

Camera/3D depth sensor 1002 captures digital images and video and can include both front-facing and rear-facing cameras. The 3D depth sensor can be any sensor capable of capturing 3D data or point clouds, such as a time of flight (TOF) sensor or LiDAR.

Communication functions can be facilitated through wireless communication subsystems 1012, which can include radio frequency (RF) receivers and transmitters (or transceivers) and/or optical (e.g., infrared) receivers and transmitters. The specific design and implementation of the wireless communication subsystem 1024 can depend on the communication network(s) over which a mobile device is intended to operate. For example, architecture 1000 can include communication subsystems 1024 designed to operate over a GSM network, a GPRS network, an EDGE network, a Wi-Fi™ network and a Bluetooth™ network. In particular, the wireless communication subsystems 1024 can include hosting protocols, such that the mobile device can be configured as a base station for other wireless devices.

Audio subsystem 1005 can be coupled to a speaker 1003 and one or more microphones 1004 to facilitate voice-enabled functions, such as voice recognition, voice replication, digital recording and telephony functions. Audio subsystem 1005 can be configured to receive voice commands from the user.

I/O subsystem 1013 can include touch surface controller 1017 and/or other input controller(s) 1015. Touch surface controller 1017 can be coupled to a touch surface 1018. Touch surface 1018 and touch surface controller 1017 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 1046. Touch surface 1018 can include, for example, a touch screen or the digital crown of a smart watch. I/O subsystem 1013 can include a haptic engine or device for providing haptic feedback (e.g., vibration) in response to commands from processor or a digital signal processor (DSP) 1022. In an embodiment, touch surface 1018 can be a pressure-sensitive surface.

Other input controller(s) 1015 can be coupled to other input/control devices 1016, such as one or more buttons, rocker switches, thumb-wheel, infrared port and USB port. The one or more buttons (not shown) can include an up/down button for volume control of speaker 1003 and/or microphones 1004. Touch surface 1018 or other input control devices 1016 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 1018; and a pressing of the button for a second duration that is longer than the first duration may turn power to the mobile device on or off. The user may be able to customize a functionality of one or more of the buttons. The touch surface 1018 can, for example, also be used to implement virtual or soft buttons.

In some implementations, the mobile device can present recorded audio and/or video files, such as MP3, AAC and MPEG files. In some implementations, the mobile device can include the functionality of an MP3 player. Other input/output and control devices can also be used.

Memory interface 1021 can be coupled to memory 1023. Memory 1023 can include high-speed random access memory and/or non-volatile memory, such as one or more magnetic disk storage devices, one or more optical storage devices and/or flash memory (e.g., NAND, NOR). Memory 1023 can store operating system 1024, such as the iOS operating system developed by Apple Inc. of Cupertino, Calif. Operating system 1024 may include instructions for handling basic system services and for performing hardware dependent tasks. In some implementations, operating system 1024 can include a kernel (e.g., UNIX kernel).

Memory 1023 may also store communication instructions 1025 to facilitate communicating with one or more additional devices, one or more computers and/or one or more servers, such as, for example, instructions for implementing a software stack for wired or wireless communications with other devices. Memory 1023 may include graphical user interface instructions 1026 to facilitate graphic user interface processing; sensor processing instructions 1027 to facilitate sensor-related processing and functions; phone instructions 1028 to facilitate phone-related processes and functions; electronic messaging instructions 1029 to facilitate electronic-messaging related processes and functions; web browsing instructions 1030 to facilitate web browsing-related processes and functions; media processing instructions 1031 to facilitate media processing-related processes and functions; GNSS/Location instructions 1032 to facilitate generic GNSS and location-related processes; and camera/3D depth sensor instructions 1033 for capturing images (e.g., video, still images) and depth data (e.g., a point cloud). Memory 1023 further includes spatial audio instructions 1034 for use in spatial audio applications, including but not limited AR and immersive video applications. Instructions 1034 include head tracking instructions and implements the user pose change detection features and processes, described in reference to FIGS. 1-9.

Each of the above identified instructions and applications can correspond to a set of instructions for performing one or more functions described above. These instructions need not be implemented as separate software programs, procedures, or modules. Memory 1023 can include additional instructions or fewer instructions. Furthermore, various functions of the mobile device may be implemented in hardware and/or in software, including in one or more signal processing and/or application specific integrated circuits.

Figure 11:
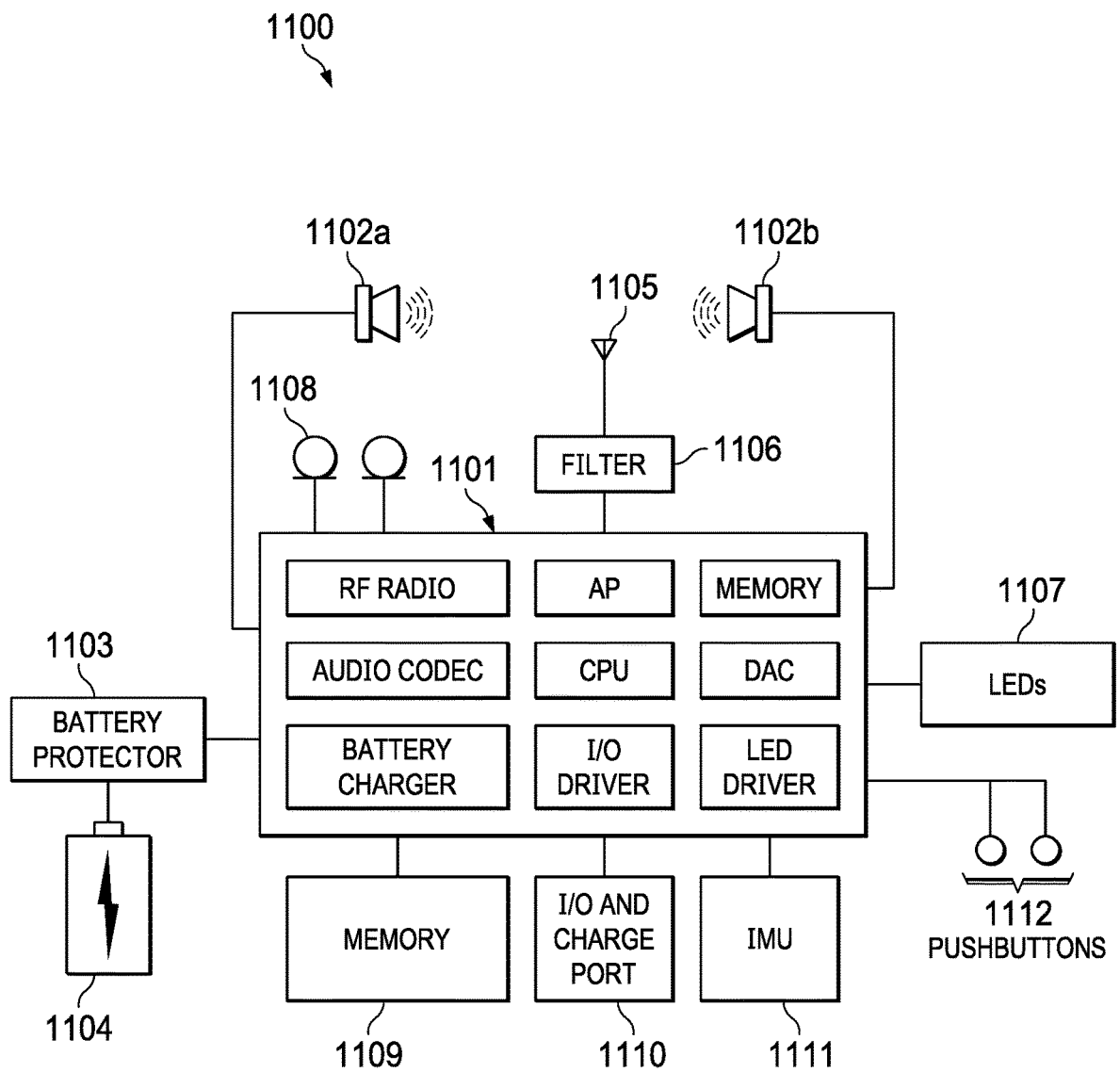
FIG. 11 a block diagram of headset architecture implementing the features and operations described in reference to FIGS. 1-9.

FIG. 11 a conceptual block diagram of headset software/hardware architecture 1100 implementing the features and operations described in reference to FIGS. 1-9. In an embodiment, architecture 1100 can includes system-on-chip (SoC) 1101, stereo loudspeakers 1102a, 1102b (e.g., ear buds, headphones, ear phones), battery protector 1103, rechargeable battery 1104, antenna 1105, filter 1106, LEDs 1107, microphones 1108, memory 1109 (e.g., flash memory), I/O/Charge port 1110, IMU 1111 and pushbuttons 1112 for turning the headset on and off, adjusting volume, muting, etc. IMU 1111 was previously described in reference to FIGS. 1-9, and includes, for example, a 3-axis MEMS gyro and a 3-axis MEMS accelerometer.

SoC 1101 further includes various modules, such as a radio frequency (RF) radio (wireless transceiver) for wireless bi-directional communication with other devices, such as a source device 103, as described in reference to FIGS. 1-9. SoC 1101 further includes an application processor (AP) for running specific applications, memory (e.g., flash memory), central processing unit (CPU) for managing various functions of the headsets, audio codec for encoding/decoding audio, battery charger for charging/recharging rechargeable battery 1104, I/O driver for driving I/O and charge port (e.g., a micro USB port), digital to analog converter (DAC) converting digital audio into analog audio and LED driver for driving LEDs 1107. Other embodiments can have more or fewer components.

Figure 12:
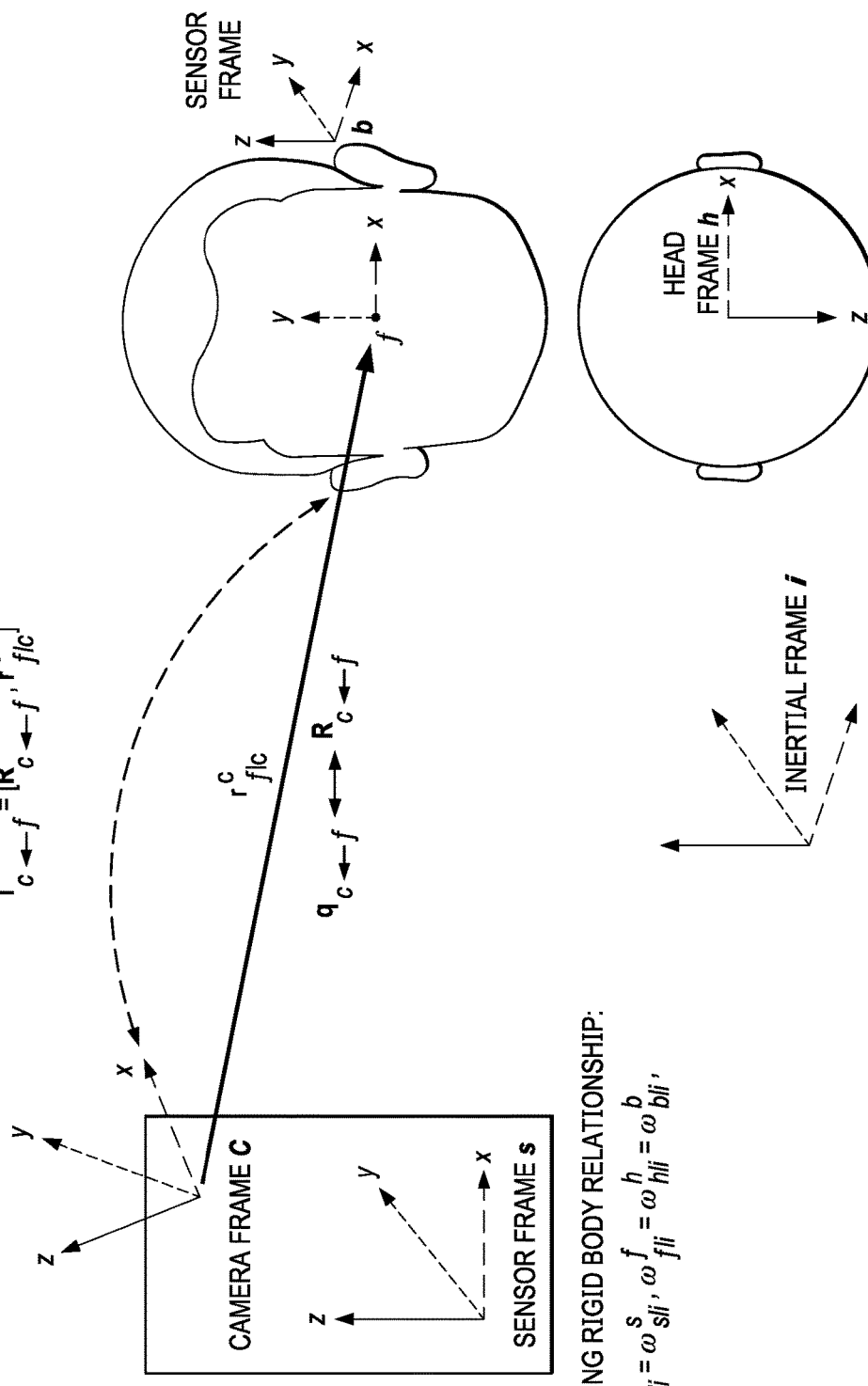
FIG. 12 illustrates various reference frames and notation for relative pose tracking, according to an embodiment.

FIG. 12 illustrates various reference frames and notation for relative pose tracking, according to an embodiment, as described more fully in Appendix A attached hereto.

Figure 13:
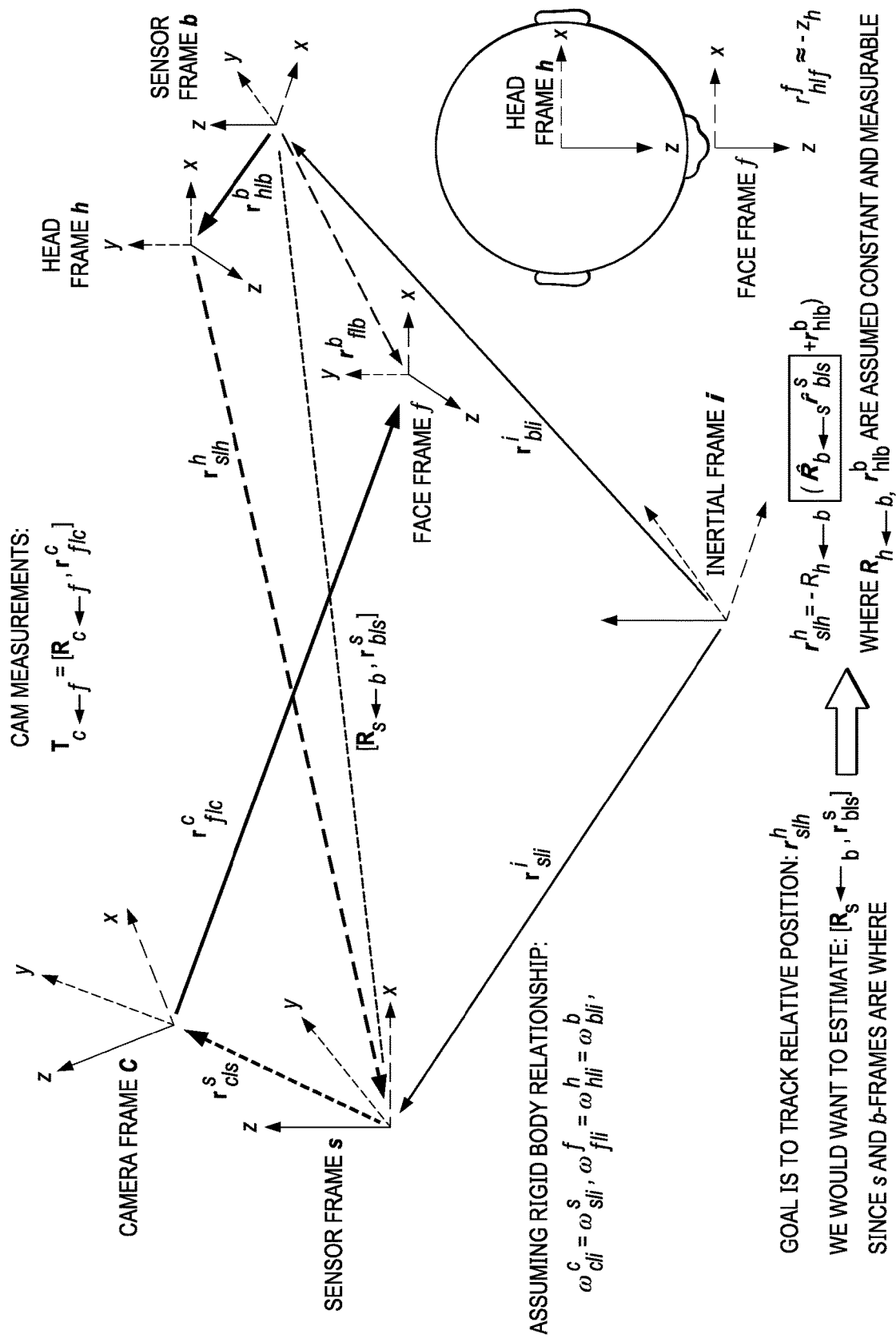
FIG. 13 illustrates the geometry for a relative motion model used in headtracking, according to an embodiment.

FIG. 13 illustrates the geometry for a relative motion model used in headtracking, according to an embodiment, as described more fully in Appendix A attached hereto The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., SWIFT, Objective-C, C#, Java), including compiled or interpreted languages, and it can be deployed in any form, including as a stand-alone program or as a module, component, subroutine, a browser-based web application, or other unit suitable for use in a computing environment.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A method comprising:
    obtaining, using one or more processors of a source device, source device motion data from a source device and headset motion data from a headset worn by a user;
    estimating, using the one or more processors of the source device, a gravity vector from one of the source device or headset motion data;
    splitting, using the one or more processors, the source device and headset motion data into vertical and horizontal planes, the vertical plane in a direction of the estimated gravity vector and the horizontal plane perpendicular to the estimated gravity vector;

calculating, using the one or more processors, similarity measures based on the source device motion data and headset motion data in the vertical and horizontal planes over a time window;

in accordance with detecting a user posture change event based on the calculated similarity measures, resetting a head pose tracker error after the detected user posture change event; and in accordance with not detecting a user posture change event based on the calculated similarity measures, not resetting the head pose tracker error.

2. The method of claim 1, wherein the user posture change event is detected when there is a sustained rotation and translation similarity over the time window.

3. The method of claim 1, wherein the detected user posture change event signals a start and stop of the user posture change event.

4. The method of claim 3, wherein the user posture change event starts when the user stands up from a seated position and ends when the user starts walking.

5. The method of claim 1, wherein each similarity measure is compared to a threshold value plus a baseline value.

6. The method of claim 5, wherein the threshold is adaptive based on a history of similarity detections.

7. The method of claim 5, wherein the baseline value is a moving average of a particular similarity computed over the time window.

8. The method of claim 1, wherein detecting a user posture change event based on the calculated similarity measures further comprises:

determining whether at least one of the vertical or horizontal translation similarity measure exceeds a first threshold;

determining whether at least one of the vertical or horizontal rotation similarity measure exceeds a second threshold; and in accordance with determining that the at least one of the vertical or horizontal translation similarity measure exceeds the first threshold, and the at least one of the vertical or horizontal rotation similarity measure exceeds the second threshold, detecting the user posture change event.

9. The method of claim 1, further comprising:

transitioning, using the one or more processors, a state machine from a tracking state to a user posture change event or vice-versa.

10. The method of claim 1, wherein the source device is a mobile device configured to present visual content synchronized with spatial audio played through the headset.

11. A system comprising:

one or more processors;

memory storing instructions that when executed by the one or more processors, cause the one or more processors to perform operations comprising:

obtaining, using one or more processors of a source device, source device motion data from a source device and headset motion data from a headset worn by a user;

estimating, using the one or more processors of the source device, a gravity vector from one of the source device or headset motion data;

splitting, using the one or more processors, the source device and headset motion data into vertical and horizontal planes, the vertical plane in a direction of the estimated gravity vector and the horizontal plane perpendicular to the estimated gravity vector;

calculating, using the one or more processors, similarity measures based on the source device motion data and headset motion data in the vertical and horizontal planes over a time window;

in accordance with detecting a user posture change event based on the calculated similarity measures, resetting a head pose tracker error after the detected user posture change event and in accordance with not detecting a user posture change event based on the calculated similarity measures, not resetting the head pose tracker error.

12. The system of claim 11, wherein the user posture change event is detected when there is a sustained rotation and translation similarity over the time window.

13. The system of claim 11, wherein the detected user posture change event signals a start and stop of the user posture change event.

14. The system of claim 13, wherein the user posture change event starts when the user stands up from a seated position and ends when the user starts walking.

15. The system of claim 11, wherein each similarity measure is compared to a threshold value plus a baseline value.

16. The system of claim 15, wherein the threshold is adaptive based on a history of similarity detections.

17. The system of claim 15, wherein the baseline value is a moving average of a particular similarity computed over the time window.

18. The system of claim 11, wherein detecting a user posture change event based on the calculated similarity measures further comprises:

determining whether at least one vertical or horizontal translation similarity measure exceeds a first threshold;

determining whether at least one of the vertical or horizontal rotation similarity measure exceeds a second threshold; and in accordance with determining that the at least one of the vertical or horizontal translation similarity measure exceeds the first threshold, and the at least one vertical or horizontal rotation similarity measure exceeds the second threshold, detecting the user posture change event.

19. The system of claim 11, wherein the operations further comprise:

transitioning, using the one or more processors, a state machine from a tracking state to a user posture change event or vice-versa.

20. The system of claim 11, wherein the source device is a mobile device configured to present visual content synchronized with spatial audio played through the headset.

* * * * *

UNITED STATES PATENT AND TRADEMARK OFFICE
CERTIFICATE OF CORRECTION

PATENT NO. : 11,675,423 B2
APPLICATION NO. : 17/351195
DATED : June 13, 2023
INVENTOR(S) : Mehmet Akgul et al.

It is certified that error appears in the above-identified patent and that said Letters Patent is hereby corrected as shown below:

In the Claims

Column 14, Line 17, In Claim 11, delete "event" and insert -- event; --.

Signed and Sealed this
Thirtieth Day of April, 2024

Katherine Kelly Vidal
*Director of the United States Patent and Trademark Office*